United States Patent [19]

Seya et al.

[11] 4,183,131

[45] Jan. 15, 1980

[54] PROCESS OF MANUFACTURING A CENTRIFUGAL ANGULAR ADVANCE DEVICE FOR AN INTERNAL COMBUSTION ENGINE

[75] Inventors: Seiichi Seya, Katsuta; Masao Omori, Hitachi; Masahide Sakamoto, Katsuta, all of Japan

[73] Assignee: Hitachi, Ltd., Japan

[21] Appl. No.: 880,936

[22] Filed: Feb. 24, 1978

[30] Foreign Application Priority Data

Mar. 1, 1977 [JP] Japan ................................ 52-22341

[51] Int. Cl.² ................................ B23P 19/00

[52] U.S. Cl. ................................ 29/434; 29/445; 29/DIG. 21; 29/526 R; 64/25; 123/117 R

[58] Field of Search .................. 29/434, 156.4 R, 445, 29/DIG. 21, 522, 509, 526 R; 64/25; 123/117 R

[56] References Cited

U.S. PATENT DOCUMENTS

| | | | |
|---|---|---|---|
| 2,699,657 | 1/1955 | Vogel | 64/25 |
| 2,800,809 | 7/1957 | Pike | 29/DIG. 21 |
| 3,098,366 | 7/1963 | Frank | 64/25 |
| 3,424,875 | 1/1969 | Ojala | 64/25 X |
| 3,923,028 | 12/1975 | Campbell et al. | 64/25 X |
| 3,942,492 | 3/1976 | Iguchi | 64/25 X |
| 4,075,752 | 2/1978 | Brammer et al. | 29/434 |

*Primary Examiner*—Charlie T. Moon

*Attorney, Agent, or Firm*—Craig and Antonelli

[57] ABSTRACT

A centrifugal angular advance device for internal combustion engines is provided with a pair of weights and an advance plate engaged with the pair of weights for provision of an angular advance. Each of the pair of weights comprises a blank or integrated blanks and a drive pin secured to the blank or integrated blanks for driving the advance plate. The blank or integrated blanks is hardened after a bushing having no effect on the hardening has been provided in the hole of the blank or integrated blanks for the drive pin. The bushing is precisely finished by reaming with a reamer, then the drive pin is press-fitted into the bushing. Thus the weight is completed.

10 Claims, 4 Drawing Figures

PROCESS OF MANUFACTURING A CENTRIFUGAL ANGULAR ADVANCE DEVICE FOR AN INTERNAL COMBUSTION ENGINE

BACKGROUND OF THE INVENTION

This invention relates to a centrifugal angular advance device for internal combustion engines, particularly to improvements on weights used in the centrifugal angular advance device.

Generally, the centrifugal angular advance device comprises a base plate secured to a rotary shaft driven by an engine, a pair of weights arranged on the base plate symmetrically with respect to an axis of the base plate, and an advance member engaged with the pair of weights so that the advance member will angularly advance relatively to the base plate when rotating. The advance member is provided thereon with a cam or magnetic rotor which actuates an ignition circuit for the internal combustion engines, as well known.

Each weight of the pair of weights has a drive pin rigidly fixed thereto which drives the advance member to provide an angular advance of the advance member according to rotation of the base plate. It is necessary for the advance member to make a smooth movement. Therefore, the drive pin is required to have hard and smooth face which is in contact with the advance member.

There are known weights in which first, precisely finished drive pins are fixed to the weights, then the drive pins are subjected to cementation and quenching. Thus produced weights have a defect that precisely finished drive pins are roughed. In the centrifugal angular advance device in which the cam is provided, an amount of lagging in the relative angular movement of the advance member which is brought by contact of the advance member and roughed drive pins, is relatively small because the advance member is forced to move by shocks due to contacting and breaking of contacts of the ignition circuit. On the other hand, in the centrifugal angular advance device in which the magnetic rotor is provided, which is so-called, of non-contact type, the lagging becomes large as compared with the above-mentioned device, because there is no shock in this device.

Further, there are known centrifugal angular advance devices in which drive pins provided in weights each have a ball bearing, for example by Japanese Open-laying of Patent Application No. 79838/76 and Japanese Patent Publication No. 36403/76. By provision of the ball bearing, sticking or lagging has been extreamly improved.

The drive pin with the ball bearing is press-fitted in the weight hardened. A hole of the weight made for the drive pin must be precisely finished, but the hardening causes the precisely finished hole to deform. When the press-fitting is effected under the deformation of the hole, strong fitting is not expected, or cracking of the weight may be produced. Therefore, it is necessary to correct the deformation of the hole by precisely finishing it. Usually, the precise finishing of the hole after the hardening is carried out by grinding or honing. However, as the diameter of the drive pin with the ball bearing is small, it is difficult to grind the hole of such a small diameter. The grinding or horning of such small hole is not suitable for mass production because of much time comsumption. Further, even if the hole is precisely finished, some of the weights may accompany cracks thereof when the drive pins are pressfitted.

SUMMARY OF THE INVENTION

An object of the invention is to provide a centrifugal angular advance device for internal combustion engines which is able to make a substantially fixed angular advance when the engine rotates at a certain revolution number.

Another object of the invention is to provide a centrifugal angular advance device for internal combustion engines in which a pair of weights used therein are easily manufactured without breakage and able to surely make an fixed angular advance in response to engine revolution.

Further another object of the invention is to provide a centrifugal angular advance device for internal combustion engines of which the function can be maintained for a long time, for example as long as the life time of the internal combustion engines.

Briefly stated, a feature of the present invention is that a drive pin which is fixed to weights used in the centrifugal angular advance device for driving a member engaged with the pin by centrifugal force applied on the weight is press-fitted in a bushing fixed to the weight, after the weight with the bushing is subjected to hardening and the bush is precisely finished by machining. The bushing has no effect on the hardening, for example, it is made of low carbon steel plated with copper, brass etc.

DESCRIPTION OF THE PREFERRED EMBODIMENT

Figure 1:
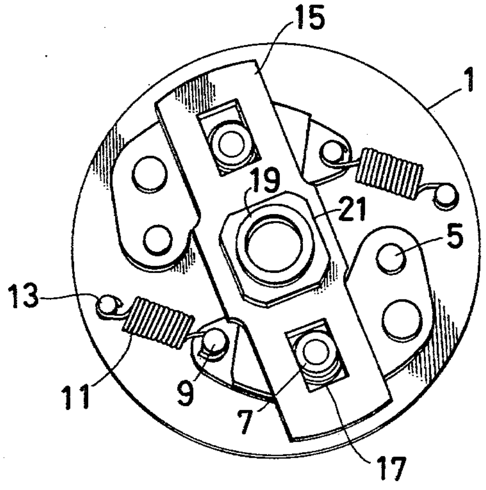
FIG. 1 is a perspective view of an embodiment of a centrifugal angular advance device for internal combustion engines according to the invention.

Referring to FIG. 1, a centrifugal angular advance device for internal combustion engines will be described hereinafter.

In FIG. 1, a base plate 1 is secured to a shaft (not shown) and driven by an internal combustion engine through the shaft to rotate about an axis thereof. In the base plate 1, a pair of weights 3 are disposed symmetrically with respect to the axis of the base plate 1 and connected to the base plate 1 by supporting pin 5 which has at one end a head portion, and at the opposite end a portion secured to the base plate 1 by riveting down. The weights 3 are each provided with a drive pin 7 with a ball bearing 71 and a hook pin 9 for retaining one end of a spring 11 which is supported at the other end by a hook pin 13 secured to the base plate 1. An advance plate 15 has at both end portions rectangular holes 17 in which the pins 7 are inserted, and a shaft 19 secured thereto at a central portion. The shaft 19 is provided with a cam 21 for actuating a contact of an ignition circuit (not shown) of the engine. The cam 21 may be a magnetic rotor for electrically actuating an ignition circuit of the engine.

When the base plate 1 is driven by the engine to rotate, the pair of weights 3 each swing outwardly about the supporting pin 5 against force of the spring 11 by centrifugal force. The advance plate 15 is driven by the weights 3 to make angular advance relative to the base plate 1. The angular advance of the advance plate 15 is carried out by outward movements of the drive pins 7 in the rectangular holes 17 while contacting with the ball bearing 71 of the pins 7.

Figure 2:
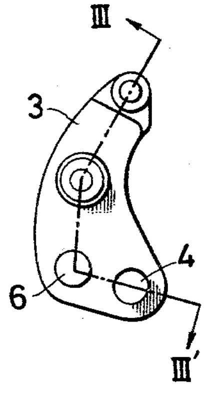
FIG. 2 is a plane view of a weight used in the embodiment in FIG. 1.
Figure 3:
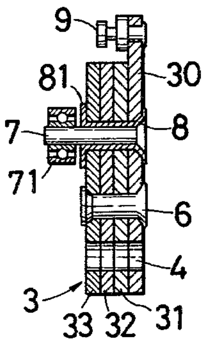
FIG. 3 is a section view of the weight taken along a line 3—3 in FIG. 2.

As shown in FIGS. 2 and 3, weights 3 each comprise a blank 30 and a plurality of blanks 31, 32, 33 of substantially the same shape. These blanks 30, 31, 32, 33 are made of a low carbon steel plate by blanking with a press. The blanks 31, 32, 33 each have three holes one of which is used for the supporting pin 5, another for a rivet 6 and the other for the drive pin 7. The blank 30 has four holes, that is, it has one for the hook pin 9 in addition to the same three holes as ones of the blanks 31, 32, 33. The hole for the drive pin 7 is elongated for insertion of a bushing 8 with a flange 81.

The bushing is made of material having no effect on hardening such as brass, low carbon steel plated with copper.

Figure 4:
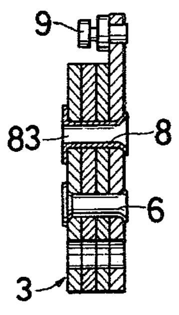
FIG. 4 is a section view of the weight taken along a line 3—3 in FIG. 2 before a drive pin is press-fitted.

After the hook pin 9 is secured to the blank 30 by riveting, the blanks 30, 31, 32, 33 are laminated and assembled by the rivet 6 and the bushing 8 into an integrated form as shown in FIG. 4. The hook pin 9 may be secured to the blank 30 after the blanks 30, 31, 32, 33 are integrated. The bushing 8 and rivet 6 are, at these ends, deformed by riveting down, spinning or pressing.

The integrated weight 3 is subjected to cementation and quenching to harden it to prevent frictional wear of the hook pin 9 and the hole 4 for the supporting pin 5.

The bushing 8 and the hole for the supporting pin 5 of the hardened weight 3 are precisely finished. As the bushing 8 is not hardened, it is finished by machining such as reaming with a reamer. The hole is finished by grinding or honing with a honing machine.

The drive pin 7 with a ball bearing 71, which pin is previously hardened, is press-fitted into the bushing 8 thereby the weight 3 is completed.

Two of the thus produced weights 3, are arranged on the base plate 1 symmetrically with respect to the rotation axis of the base plate 1 and connected to the base plate 1 by inserting the supporting pin 5 and then deforming its end in a conventional manner. The springs 11 are hooked on the hook pins 9, 13. The advance plate is engaged with the pair of weights 3 by insertion of the drive pins 7 into the rectangular holes 17.

In the weight 3 subjected to hardening, the bushing 8 is not hardened so that the precise machining such as the reaming can be easily carried out. As well known, generally, the machining has less labour-consumption than the honing. Therefore, the weight 3 employing the bushing 8 for mounting the drive pin 7 thereon is suitable for mass production thereof. Further, the bushing 8 is more deformable than the blanks 30, 31, 32, 33, therefore the hardened drive pin 7 is more easily and rigidly inserted in the bushing 8 without breakage of the blanks 30, 31, 32, 33 than it is directly inserted into the hardened blanks 30, 31, 32, 33.

While, usually, a weight comprising a plurality of blanks is integrated by at least two rivets, in case of the weight 3, the bushing 8 has a function of one of the two rivets, therefore the weight 3 is further advantageous in saving labour as well as material.

We claimed:

1. A process of manufacturing centrifugal angular advance device for internal combustion engines comprising the steps of:

preparing a base plate driven by an internal combustion engine, forming a weight as a blank with a plurality of holes, securing a bushing to one of the holes of the weight, the bushing being free from hardening, subjecting the weight to hardening, machining precisely the inner face of the bushing after the step of subjecting the weights to hardening, press-fitting a drive pin into the bore of the bushing, connecting a pair of the weights to the base plate with supporting pins so that the pair of the weights are disposed on the base plate symmetrically with respect to an axis of the base plate, whereby the pair of weights swing about the supporting pins when the base plate is rotated, engaging springs with the base plate and each of the pair of weights, and arranging an advance member to engage with the drive pins of the weights so that the advance member is angularly advanced relatively to the base plate when rotated, whereby the advance member provides a spark advance position.

2. The process of manufacturing a centrifugal angular advance device as defined in claim 1, wherein the step of machining is carried out by reaming.

3. The process of manufacturing a centrifugal angular advance device as defined in claim 1, wherein the bushing is made of low carbon steel and plated with copper.

4. The process of manufacturing a centrifugal angular advance device as defined in claim 1, wherein the bushing is made of brass.

5. The process of manufacturing a centrifugal angular advance device as defined in claim 1, wherein the step of subjecting the pair of weights to hardening comprises the steps cementation and quenching.

6. The process of manufacturing a centrifugal angular advance device as defined in claim 5, further including the step of grinding the hole of the weights for receiving the supporting pin.

7. A process of manufacturing a centrifugal angular advance device for internal combustion engines comprising the steps of preparing a base plate driven by an internal combustion engine, blanking a low carbon steel plate to make a plurality of first blanks for a weight, each of the first blanks having a plurality of holes which are for a supporting pin, a rivet and a bushing, respectively, blanking a low carbon steel plate to provide a second blank for the weight, the second blank having the same holes as ones of the first blanks and a spring receiving portion, laminating the plurality of the first blanks and the second blank, inserting a rivet into the hole of the laminated blanks, riveting down the rivet to provide the weight of the integrated blanks, inserting a bushing into the weight, the bushing having a bore being of material taking no effect of hardening, riveting down the bushing to integrate the weight in cooperation with the rivet, subjecting the weight with reveted bushing to hardening cementation and quenching, honing the hole of the weight for the supporting pin, reaming the bore of the bushing of the hardening weight, press-fitting a drive pin into the bore of the bushing, connecting a pair of the weights to the base plate by supporting pins so that the pair of weights swing about the supporting pins when the base plate is rotated, engaging springs with the base plate and each of the pair of weights at spring receiving portions thereof, and engaging an advance member with the drive pins of the weights.

8. The process of manufacturing a centrifugal angular advance device as defined in claim 7, wherein the spring receiving portion of each weight is made as a hole for a spring hook pin and includes the steps of inserting the spring hook pin into the hole and riveting the spring hook.

9. The process of manufacturing a centrifugal angular advance device as defined in claim 8, wherein the bushing is made of low carbon steel plated with copper.

10. The process of manufacturing a centrifugal angular advance device as defined in claim 8, wherein the bushing is made of brass.

* * * * *